April 17, 1945.  F. W. GODSEY, JR  2,374,008
REGULATING SYSTEM
Filed Feb. 2, 1943

WITNESSES:

INVENTOR
Frank W. Godsey, Jr.
BY
ATTORNEY

Patented Apr. 17, 1945

2,374,008

UNITED STATES PATENT OFFICE 2,374,008

REGULATING SYSTEM

Frank W. Godsey, Jr., Forest Hills, Pa., assignor to Westinghouse Electric & Manufacturing Company, East Pittsburgh, Pa., a corporation of Pennsylvania Application February 2, 1943, Serial No. 474,473

2 Claims. (Cl. 171—229)

This invention relates to regulating systems.

A circuit control apparatus of the type disclosed and claimed in Patent No. 2,246,301, issued June 17, 1941, to C. R. Hanna et al. has found wide application in the control of many different dynamo-electric machines and systems. However, the amount of power which can be handled by the contact members of the circuit controlling apparatus is limited to a rather low amount because of arcing and contact resistance, thereby narrowing the field of application for such circuit controlling apparatus, or requiring the use of auxiliary exciters and other equipment. Such auxiliary apparatus adds greatly to the cost as well as the bulk and weight of the regulating equipment and the maintenance cost.

It is an object of this invention to provide in a regulating system which utilizes a rheostat and a plurality of progressively movable conducting members to control the connections of the rheostat for limiting the flow of current in the conducting members.

Another object of this invention is to provide in a regulating system for controlling the connections to resistor sections by a plurality of progressively movable conducting members, a number of the conducting members directly controlling the connections of certain of the resistor sections, whereas others of the conducting members indirectly control the connections to other resistor sections.

Figure 1:
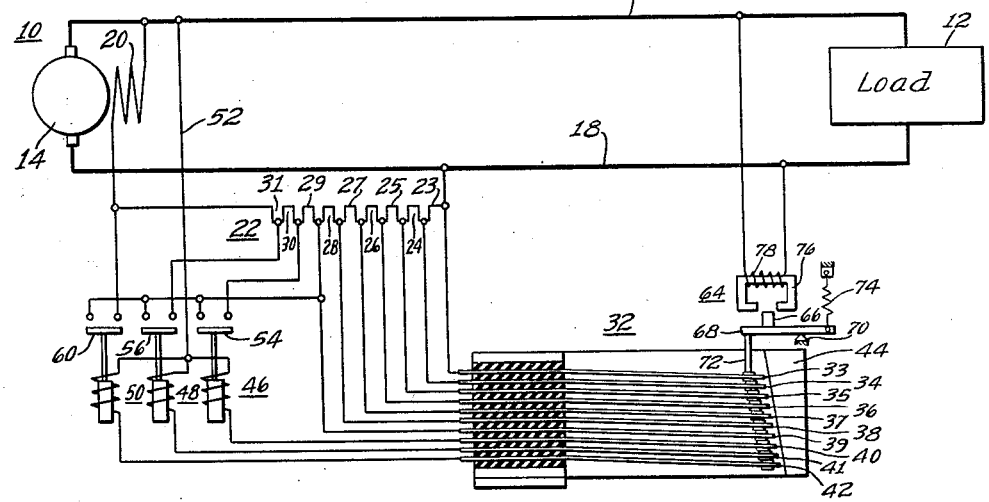
Figure 2:
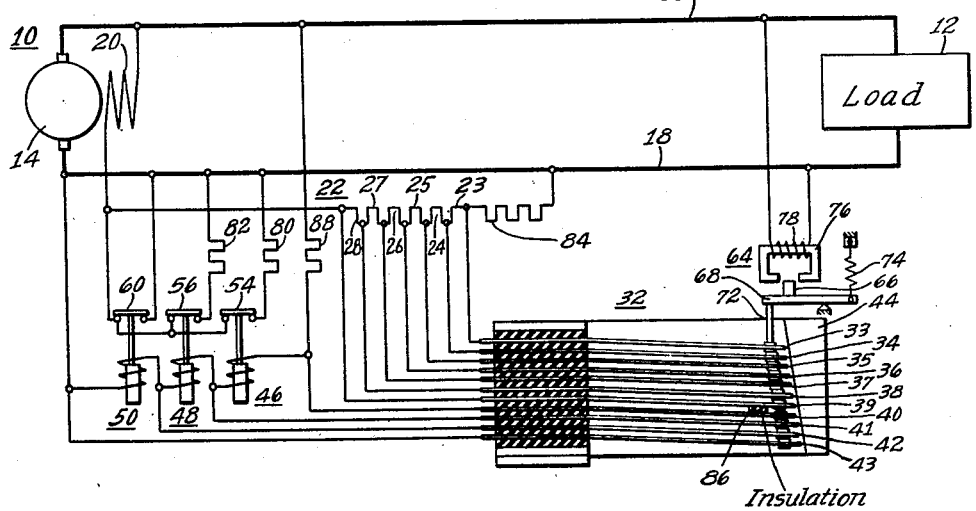

Other objects of this invention will become apparent from the following description when taken in conjunction with the accompanying drawing, in which:

Figure 1 is a diagrammatic view of apparatus and circuits embodying the teachings of this invention; and Fig. 2 is a diagrammatic view of another modification of this invention.

Referring to Fig. 1, this invention is illustrated for controlling the voltage of a generator 10 disposed to be driven by a prime mover (not shown) for supplying a load 12. The generator 10 comprises an armature winding 14 connected by conductors 16 and 18 to the load 12 and a shunt field winding 20. The shunt field winding 20 is connected at one end to conductor 16, the other end being disposed to be connected through a field rheostat 22 to conductor 18. The rheostat 22, is formed of a number of resistor sections 23, 24, 25, 26, 27, 28, 29, 30, and 31 disposed to be shunted under predetermined conditions by a circuit controlling apparatus 32 in response to changes in voltage across conductors 16 and 18.

The circuit controlling apparatus 32 is of the type disclosed and claimed in Patent No. 2,246,301, identified hereinbefore and comprises in this instance a plurality of long thin conducting members 33, 34, 35, 36, 37, 38, 39, 40, 41, and 42 stacked and secured at one end in fixed insulated relation to one another, the other ends carrying contact buttons and being self-biased in a direction to seat against a sloped stop 44. The fixed ends of conductor members 33 through 39 are progressively connected to the taps of the resistor sections 23 through 28 to control the shunting thereof under predetermined conditions, the fixed ends of conducting members 40, 41, and 42 being progressively connected to one end of the energizing windings of electromagnetic switches 46, 48, and 50 respectively. As illustrated, the other ends of the energizing windings of the electromagnetic switches are connected by the common conductor 52 to the line conductor 16. Each of the electromagnetic switches 46, 48, and 50 is provided with a contact member 54, 56, and 60, respectively, disposed to shunt resistor sections 29, 30, and 31, respectively, when the switches are energized.

As illustrated, an electromagnetic device 64 is associated with the long thin self-biased conducting members of the control apparatus 32 disposed to control the progressive operation of the conducting members in response to a change in voltage across the conductors 16 and 18. The electromagnetic device 64 comprises an armature member 66 carried by an arm 68 which is disposed for pivotal movement about a pivot 70. An insulated driver member 72 is carried by the arm 68 disposed to engage the conducting member 33 for effecting a progressive movement of the conducting members, a spring member 74 being provided to bias the driver member 72 into engagement with the conducting members. The core member 76 of the electromagnetic device is provided with a winding 78 which is connected across the conductors 16 and 18 and responsive to the voltage thereof for balancing the arm 68 against the bias of the spring 74.

In operation, when the generator 10 is energized in a predetermined manner to supply the load 12, a normal or required voltage exists across conductors 16 and 18 and the winding 78 of the electromagnetic device 64 is energized to so position the driver member 72 of the actuating mechanism that only a portion of the conducting members 33 through 42 are in engagement, the remaining portion of the conducting members being seated in spaced relation against the stop 44. For example, for a required voltage, conducting members 33 through 36 may be considered as being normally in engagement, thereby shunting resistor sections 23, 24, and 25 from the field circuit of the generator 10.

If for any reason the voltage across conductors 16 and 18 should decrease, then the winding 78 is so deenergized that the spring 74 actuates the driver member 72 to effect engagement between the conducting members 36 and 37, thereby shunting resistor section 26 from the field circuit to increase the excitation thereof and increase the voltage across conductors 16 and 18.

If this change in the voltage is insufficient for obtaining the required voltage across the conductors 16 and 18, the driver member 72 is further actuated to effect the progressive engagement of the conducting members 37, 38, 39, and 40 to effectively shunt resistor sections 27, 28, and 29, from the field circuit to increase the energization of the generator and increase the voltage across conductors 16 and 18.

In this operation, it is to be noted that as resistor sections 23 through 28 are shunted from the field winding circuit that the field current flows through the contact buttons carried by the conducting members 33 through 39, but that as the contact button of conducting member 39 engages the contact button of conducting member 40, the current flowing through the contact button of conducting member 40 is unaffected by any further change in the field current. This result is obtained since the engagement of contact buttons carried by the conducting members 39 and 40 closes a circuit which extends from conductor 16 through conductor 52, the energizing winding of electromagnet switch 46, conducting member 40, and the contact buttons of the engaged conducting members through conductor member 33 to conductor 18. The establishment of this circuit so energizes the winding of the switch 46 as to actuate the contact member 54 upwardly to the position where it closes a circuit to shunt the resistor section 29 of the rheostat 22.

Likewise, if the movable conducting members are further actuated to the position where the contact button of conducting member 40 engages the contact button of conducting member 41, the energizing winding of electromagnetic switch 48 is energized to actuate the contact member 56 to a position where it closes a circuit to shunt the resistor section 30 of the rheostat 22 from the field circuit to effect a further increase in the energization of the field winding 20.

The engagement of the contact buttons of conducting members 41 and 42 effects the energization of the energizing winding of switch 50 whereby the contact member 60 of the switch closes a circuit to shunt the resistor section 31 and connect the field winding 20 directly to conducting member 39. The field winding 20 is thus directly connected across conductors 16 and 18 it being noted however that the contact buttons of conducting members 40, 41 and 42 are free of the large field current as the connection of the field winding to conductor 18 is through the engaged contact buttons of conducting members 33 through 39. Switching operations of the conducting members 40, 41 and 42 can therefore be had without accompanying arcing occasioned by large field current.

If, on the other hand, the change in voltage across conductors 16 and 18 is an increase in voltage, then the armature member 66 is actuated against the bias of the spring 74 to effect the progressive separation of the movable contact members which are then in engagement to effectively and progressively connect the resistor sections of the rheostat 22 in series with the field winding 20 of the generator 10 and thereby effect a decrease in the generator voltage. Whether the operation of the circuit controlling apparatus 32 is such as to effect an increase or a decrease in the voltage, it is to be noted that the contact buttons of the conducting members 40, 41, and 42 are free of the large field current obtained when the resistor sections 29, 30, and 31 are shunted from the field circuit.

In Fig. 2 of the drawing, the apparatus is similar to the apparatus shown in Fig. 1, like figures being used to designate like parts. However, in this embodiment instead of the single field rheostat 22, a plurality of resistor sections 23, 24, 25, 26, 27, 28, 80, 82, and 84 are employed for controlling the field current of the generator 10. As shown, the resistor section 84 is connected in series circuit relation with the series connected resistor sections 23 through 28 being disposed to be shunted from the field circuit by the electromagnetic switch 50. The connection of the resistor sections 80 and 82 in the field circuit is controlled by the electromagnetic switches 46 and 48, respectively.

Likewise, the circuit controlling apparatus 32, while being similar to that shown in Fig. 1, distinguishes in that one more conducting member, namely, conducting member 43, is provided and a block of insulation 86 is provided between the conducting members 39 and 40, the purpose of which will be explained more fully hereinafter. The block of insulation 86 may be carried by either of the conducting members 39 and 40, as desired.

Further, in the embodiment illustrated in Fig. 2, the energizing windings of the electromagnetic switches 46, 48, and 50 are connected in series circuit relation with each other and a resistor 88 across the conductors 16 and 18, the resistor 88 limiting the current flowing through the energizing windings. In this embodiment, the electromagnetic switches 46 and 48 are disposed to be shunted when the conducting members 40, 41, and 42 are in engagement, the contact members 54 and 56, respectively, of the switches being disposed to connect the resistors 80 and 82 in parallel relation to each other and to the resistor 84 when the switches are deenergized. The contact member 60 is disposed to connect the field winding directly across the conductors 16 and 18 when all of the conducting members of the circuit controlling apparatus 32 are actuated to their circuit closing position.

In operation, for a given load, the winding 78 is energized in a predetermined manner to so position the driver member 72 of the actuating apparatus as to maintain only a predetermined number of conducting members 33 through 43 in circuit closing position, the other conducting members normally seating against the sloped stop 44. For example, for a given voltage across conductors 16 and 18, the conducting members 33 through 38 are in engagement to shunt resistor sections 23, 24, 25, 26, and 27 from the field circuit, whereby the field circuit extends from conductor 16 through the field winding 20, resistor section 28, conducting member 38, and the closed contact buttons through conducting member 33 and resistor 84 to conductor 18. If for any reason the voltage across conductors 16 and 18 should decrease, then the driver member 72 is actuated to effect an engagement of the conductor members 38 and 39, and thereby effectively shunt the resistor section 28 from the field circuit of the generator 10 to increase the generator voltage.

If, however, the shunting of the resistor sections 23 through 28 is ineffective for obtaining the required voltage, the movable conducting members are so actuated as to effect an engagement between the conducting members 40 to 41 as well as the conducting members 33 through 39. The engagement of the conducting members 40 and 41 shunts the energizing winding of the electromagnetic switch 46, whereby the winding is deenergized and the contact member 54 drops to its deenergized position to connect the resistor section 80 in parallel circuit relation with the resistor section 84 to thereby decrease the amount of resistance in the field winding circuit and correspondingly increase the energization of the field winding 20.

A further movement of the driver member 72 effects the engagement of the contact buttons of conducting members 41 and 42, whereby the energizing winding of electromagnetic switch 48 is shunted to effectively deenergize the winding and permit the contact member 56 to drop to its deenergized position where it connects the resistor section 82 in parallel with the resistor section 80, both resistor sections 82 and 80 thereby being connected in parallel with the resistor section 84 to further increase the energization of the field winding 20.

If, on the other hand, the change in voltage across conductors 16 and 18 should be an increase, the driver member 72 is actuated to effect a progressive release of the conducting members 43 through 33 to progressively adjust the connections of the associated resistor sections to progressively increase the resistance in circuit with the field winding 20 to decrease the excitation thereof and, consequently, decrease the voltage across conductors 16 and 18.

For example, if after the operation described hereinbefore in which the energizing windings of switches 46 and 48 are shunted, the voltage should increase, the conducting members 42 and 41 are actuated to effect a separation of their contact buttons. The shunt circuit about the energizing winding of electromagnetic switch 48 is interrupted and the winding is energized to actuate the contact member 56 upwardly to disconnect the resistor section 82 from its parallel circuit relation with the resistor sections 80 and 84, and thereby increase the effective resistance connected in circuit with the field winding 20. Similarly, when the contact members 40 and 41 are actuated to separate their contact buttons, the contact member 54 of electromagnetic switch 46 is actuated upwardly to disconnect the resistor section 80 from the field winding circuit, leaving the resistor section 84 connected in series with the field winding 20 to thereby decrease the energization of the field winding and effect a decrease in the voltage across conductors 16 and 18. Similarly, the progressive separation of the contact buttons of conducting members 39, 38, 37, 36, etc., effectively removes the shunting circuit from the resistor sections 28, 27, 26, etc., to progressively connect the resistor sections in the field winding circuit to decrease the energization of the field winding and thereby decrease the voltage across conductors 16 and 18.

In the embodiment shown in Fig. 2, it is to be noted that the contact member 60 of electromagnetic switch 50 provides a direct connection of the field winding 20 across conductors 16 and 18 to shunt the resistor section 84 from the field winding circuit. The electromagnetic switch 50 is thereby useful in starting the system in that the contact member 60 prevents the flow of the high initial current from flowing through the contact buttons of any of the conducting members of the circuit controlling apparatus 32 until after some safe value of current has been reached, as determined by the energization of the electromagnetic device 64 to effect a separation of the contact buttons of conducting members 42 and 43 to effect the energization of the winding of electromagnetic switch 50 to actuate the contact member 60 upwardly and thereby connect the resistor section 84 in the field circuit.

In both embodiments of this invention, it is to be noted that the field current flows only through the contact buttons of the conducting members 33 through 39, the contact buttons of the conducting members 40 through 42 or 43, as the case may be, being free of such high field currents. The block of insulation 86 of the embodiment illustrated in Fig. 2 effectively prevents the current flowing through the contact buttons of conducting members 40 through 43 from flowing through the contact buttons of the conducting members 33 through 39, thereby providing means whereby the circuit controlling apparatus 32 can effectively control high currents without any accompanying detrimental arcing.

Although this invention has been described with reference to a particular embodiment thereof, it is, of course, not to be limited thereto except insofar as is necessitated by the scope of the appended claims.

I claim as my invention:

1. In a regulating system, in combination, a generator having a field winding the voltage of which is to be regulated, a number of resistor sections disposed to be connected in circuit with the field winding, means responsive to the generator voltage for controlling the connecting of the resistor sections in the field winding circuit, said means including a stack formed of a plurality of substantially evenly spaced longitudinal conducting members disposed to be progressively actuated to a circuit closing position, certain of the conducting members disposed at one end of the stack being disposed for progressive movement to circuit closing positions only after the other conducting members of the stack have been progressively actuated to circuit closing positions, and a plurality of electromagnetic switches connected to said certain of the conducting members disposed to be progressively deenergized as said certain conducting members are actuated to a circuit closing position, the electromagnetic switches being disposed to progressively connect certain of the resistor sections in parallel circuit relation with each other in the field winding circuit as the switches are deenergized, said certain others of the conducting members being connected to certain others of the resistor sections to progressively shunt them from the field winding circuit as said certain others of the conducting members are actuated to a circuit closing position, the conducting members and electromagnetic switches cooperating to control the field excitation in response to the generator voltage.

2. In a regulating system, in combination, a generator having a field winding the voltage of which is to be regulated, a number of resistor sections disposed to be connected in circuit with the field winding, means responsive to the generator voltage for controlling the connecting of the resistor sections in the field winding circuit, said means including a stack formed of a plurality of substantially evenly spaced longitudinal conducting members disposed to be progressively actuated to a circuit closing position, certain of the conducting members disposed at one end of the stack being disposed for progressive movement to circuit closing positions only after the other conducting members of the stack have been progressively actuated to circuit closing positions, a plurality of electromagnetic switches connected to said certain of the conducting members disposed to be progressively deenergized as said certain conducting members are actuated to a circuit closing position, the electromagnetic switches being disposed to progressively connect certain of the resistor sections in parallel circuit relation with each other in the field winding circuit as the switches are deenergized, said certain others of the conducting members being connected to certain others of the resistor sections to progressively shunt them from the field winding circuit as said certain others of the conducting members are actuated to a circuit closing position, and insulating means disposed between the adjacent conducting members of said certain and said certain other groups of conducting members to prevent the current flowing through said certain of the conducting members from flowing through said certain others of the conducting members, the conducting members and electromagnetic switches cooperating to control the field excitation in response to the generator voltage.

FRANK W. GODSEY, JR.